(12) United States Patent
Aoyama et al.

(10) Patent No.: US 12,466,968 B2
(45) Date of Patent: Nov. 11, 2025

(54) INK JET INK COMPOSITION, INK SET, RECORDING METHOD, AND RECORDING APPARATUS

(71) Applicant: SEIKO EPSON CORPORATION, Tokyo (JP)

(72) Inventors: Tetsuya Aoyama, Shiojiri (JP); Satoshi Tsubamoto, Osaka (JP); Masahiro Yatake, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 239 days.

(21) Appl. No.: 18/497,063

(22) Filed: Oct. 30, 2023

(65) Prior Publication Data

US 2024/0141190 A1    May 2, 2024

(30) Foreign Application Priority Data

Oct. 31, 2022    (JP) .................. 2022-174386

(51) Int. Cl.
*C09D 11/30* (2014.01)
*B41J 2/01* (2006.01)
(Continued)

(52) U.S. Cl.
CPC ................. *C09D 11/30* (2013.01); *B41J 2/01* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161;
(Continued)

(56) References Cited

U.S. PATENT DOCUMENTS

2007/0043144 A1*  2/2007  House ................. C09D 11/322
                                                        523/160
2012/0075381 A1*  3/2012  Wachi ................. C09D 11/322
                                                        524/505
(Continued)

FOREIGN PATENT DOCUMENTS

CN    114316682 A    4/2022
EP    4303279 A1    1/2024
(Continued)

*Primary Examiner* — Manish S Shah
(74) *Attorney, Agent, or Firm* — Harness, Dickey & Pierce, P.L.C.

(57) ABSTRACT

An ink jet ink composition is provided which contains water, a (meth)acrylic resin, and a wax emulsion and which is a water-based clear ink, and the (meth)acrylic resin described above satisfies predetermined requirements.

15 Claims, 1 Drawing Sheet

(51) Int. Cl.
*B41M 5/00* (2006.01)
*C09D 11/107* (2014.01)
*C09D 11/322* (2014.01)
*C09D 11/326* (2014.01)
*C09D 11/40* (2014.01)
*C09D 11/54* (2014.01)
*C09D 153/00* (2006.01)

(52) U.S. Cl.
CPC .......... *C09D 11/107* (2013.01); *C09D 11/322* (2013.01); *C09D 11/326* (2013.01); *C09D 11/40* (2013.01); *C09D 11/54* (2013.01); *C09D 153/00* (2013.01)

(58) Field of Classification Search
CPC .. B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2013/0281593 A1* | 10/2013 | Yamazaki | C09D 175/00 |
| | | | 524/377 |
| 2018/0298214 A1* | 10/2018 | Takahashi | C09D 11/38 |
| 2022/0098428 A1 | 3/2022 | Asakawa et al. | |
| 2023/0058241 A1* | 2/2023 | Asakawa | C09D 11/38 |

FOREIGN PATENT DOCUMENTS

| | | |
|---|---|---|
| JP | 2004-277449 A | 10/2004 |
| JP | 7152625 B1 | 10/2022 |
| JP | 2024-022296 A | 2/2024 |
| WO | 2022-185578 A1 | 9/2022 |

\* cited by examiner

INK JET INK COMPOSITION, INK SET, RECORDING METHOD, AND RECORDING APPARATUS

RECORDING APPARATUS

The present application is based on, and claims priority from JP Application Serial Number 2022-174386, filed Oct. 31, 2022, the disclosure of which is hereby incorporated by reference herein in its entirety.

BACKGROUND

1. Technical Field

The present disclosure relates to an ink jet ink composition, an ink set, a recording method, and a recording apparatus.

2. Related Art

Since being able to record a highly fine image by a relatively simple apparatus, an ink jet recording method has been rapidly developed in various fields. Among the developments, various studies have been carried out on ejection stability and the like. For example, in order to provide an ink which has an excellent ejection stability, which forms a printed image having less bleeding and density irregularity and a high color development property, and which is also excellent in fixability, color reproducibility, and glossiness, JP-A-2004-277449 has disclosed an aqueous ink containing at least a coloring component, resin fine particles, a moisturizing agent, a permeating agent, and water, and in the aqueous ink described above, at least a natural resin and/or a natural resin derivative is contained in a component forming the resin fine particles.

Incidentally, in recent years, in consideration of environmental compatibility, and in particular, in consideration of reduction in $CO_2$ emission, bio-derived ink components have been investigated. However, when components to be used are restricted to bio-derived components, the range of freedom to select the components is narrowed, and as a result, characteristics required as the ink may be unfavorably degraded in some cases.

SUMMARY

According to an aspect of the present disclosure, there is provided an ink jet ink composition which contains water, a (meth)acrylic resin, and a wax emulsion and which is a water-based clear ink, and the (meth)acrylic resin described above satisfies the following requirements 1 to 6. In the requirement 1, the (meth)acrylic resin includes 90 percent by mass or more of a (meth)acrylic acid-based monomer as a constituent component, the (meth)acrylic resin is a diblock copolymer including a polymer block A and a polymer block B, 50 percent by mass or more of a monomer forming the (meth)acrylic resin is a (meth)acrylate having a plant material-derived alcohol as an ester residue, the (meth)acrylate includes at least one selected from the group consisting of ethyl (meth)acrylate, tetrahydrofurfuryl (meth)acrylate, and isobornyl (meth)acrylate, and the (meth)acrylic resin has a biomass degree of 20% or more. In the requirement 2, the polymer block A of the (meth)acrylic resin is a substantially water-insoluble polymer block, the polymer block A has a number average molecular weight of 5,000 to 30,000, and the polymer block A has a molecular weight distribution of 1.0 to 1.6. In the requirement 3, the polymer block B of the (meth)acrylic resin includes (meth)acrylic acid as a constituent component, the polymer block B has a number average molecular weight of 1,000 to 10,000, and the polymer block B has an acid value of 50 to 330 mgKOH/g. In the requirement 4, the polymer block A and the polymer block B both have a glass transition temperature of 70° C. or more. In the requirement 5, the (meth)acrylic resin has a number average molecular weight of 10,000 to 40,000, and the (meth)acrylic resin has an acid value of 25 to 100 mgKOH/g. In the requirement 6, the (meth)acrylic resin has a carboxy group neutralized with an alkali and is emulsified in water, and the (meth)acrylic resin has a number average particle diameter of 10 to 300 nm measured by light scattering.

According to another aspect of the present disclosure, there is provided an ink set comprising a clear ink and a color ink, and the clear ink is the ink jet ink composition described above.

According to another aspect of the present disclosure, there is provided a recording method comprising an ejection step of ejecting the ink jet ink composition described above to a recording medium by an ink jet method.

According to another aspect of the present disclosure, there is provided a recording apparatus comprising an ink jet head to eject the ink jet ink composition described above to a recording medium.

DESCRIPTION OF EMBODIMENTS

Figure 1:
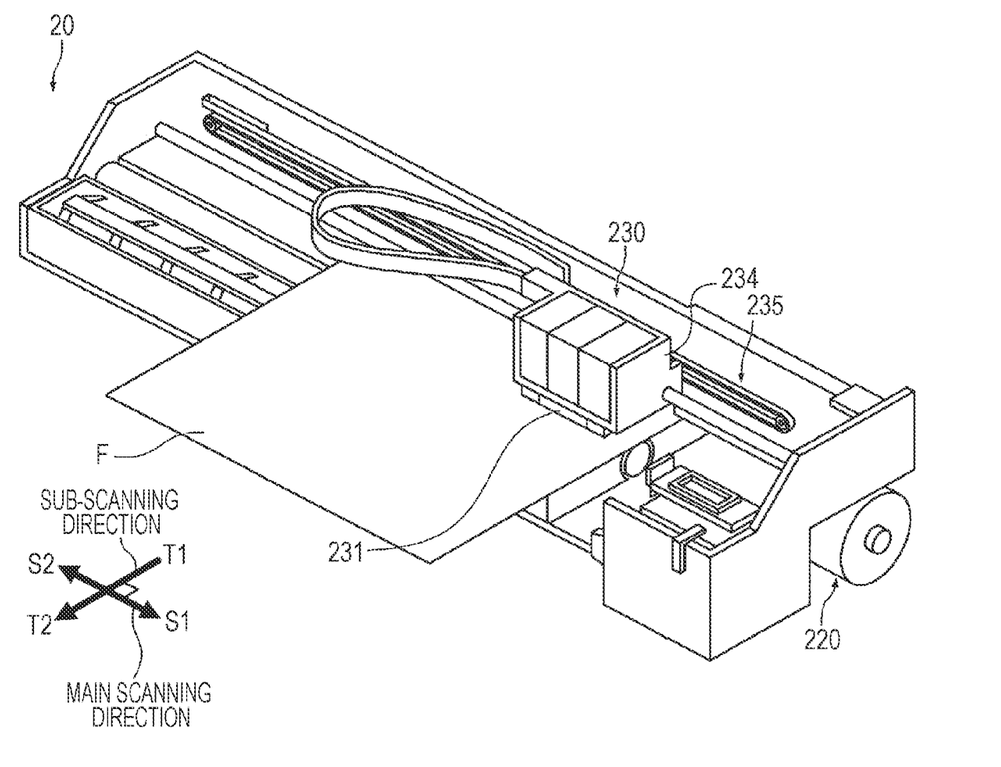
FIGURE is a schematic view of a recording apparatus to be used in this embodiment.

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, the same elements are designated by the same reference numerals, and duplicated description will be omitted. In addition, unless otherwise particularly described, the positional relationship, such as top to bottom and right to left, are based on the positional relationship shown in the drawing. Furthermore, the dimensional ratio shown in the drawing is not limited to that shown therein.

1. Clear Ink

An ink jet ink composition (hereinafter, also simply referred to as "clear ink" in some cases) of this embodiment contains water, a (meth)acrylic resin, and a wax emulsion and is a water-based clear ink, and the (meth)acrylic resin described above satisfies the following requirements 1 to 6.

In the requirement 1, the (meth)acrylic resin includes 90 percent by mass or more of a (meth)acrylic acid-based monomer as a constituent component, the (meth)acrylic resin is a diblock copolymer including a polymer block A and a polymer block B, 50 percent by mass or more of a monomer forming the (meth)acrylic resin is a (meth)acrylate having a plant material-derived alcohol as an ester residue, the (meth)acrylate includes at least one selected from the group consisting of ethyl (meth)acrylate, tetrahydrofurfuryl (meth)acrylate, and isobornyl (meth)acrylate, and the (meth) acrylic resin has a biomass degree of 20% or more.

In the requirement 2, the polymer block A of the (meth) acrylic resin is a substantially water-insoluble polymer block, the polymer block A has a number average molecular weight of 5,000 to 30,000, and the polymer block A has a molecular weight distribution of 1.0 to 1.6.

In the requirement 3, the polymer block B of the (meth) acrylic resin includes (meth)acrylic acid as a constituent component, the polymer block B has a number average molecular weight of 1,000 to 10,000, and the polymer block B has an acid value of 50 to 330 mgKOH/g.

In the requirement 4, the polymer block A and the polymer block B both have a glass transition temperature of 70° C. or more.

In the requirement 5, the (meth)acrylic resin has a number average molecular weight of 10,000 to 40,000, and the (meth)acrylic resin has an acid value of 25 to 100 mgKOH/g.

In the requirement 6, the (meth)acrylic resin has a carboxy group neutralized with an alkali and is emulsified in water, and the (meth)acrylic resin has a number average particle diameter of 10 to 300 nm measured by light scattering.

The "clear ink" is not an ink to color a recording medium and is an ink to be used for other purposes. The clear ink substantially contains no colorant. The "substantially contains no colorant" indicates that, for example, a content of the colorant contained in the clear ink with respect to a total mass of the clear ink is preferably 0.5 percent by mass or less, more preferably 0.1 percent by mass or less, and more preferably 0.01 percent by mass or less. The content described above may be the detection limit or less and may also be 0 percent by mass.

In addition, although the other purposes of the clear ink are not particularly limited, for example, there may be mentioned adjustment in glossiness of a recording medium, improvement in characteristics, such as abrasion resistance, of a recorded matter, and improvement in fixability and color development property of a color ink.

When the components to be used are restricted to bio-derived components, the range of freedom to select the components is narrowed, and as a result, the characteristics required as the ink may be unfavorably degraded in some cases. On the other hand, in this embodiment, the (meth)acrylic resin and the wax emulsion described above are used in combination.

Although being derived from biomaterials, the (meth) acrylic resin is able to form a recorded matter having a relatively excellent abrasion resistance. Furthermore, since the wax emulsion is also used together therewith, the lubricity is imparted to the recorded matter, and hence, the abrasion resistance is further improved. Accordingly, a practically usable abrasion resistance can be realized.

In addition, since a biomass resin has a structural limitation in which a bio-derived compound is required to be used as a raw material, the viscosity of the ink tends to be slightly increased, and an intermittent ejection stability tends to be degraded. On the other hand, the (meth)acrylic resin described above is not likely to degrade the intermittent ejection stability.

Hereinafter, individual components contained in the ink composition of this embodiment will be described in detail.

1.1. (Meth)Acrylic Resin (Biomass Resin)

In the clear ink, a (meth)acrylic resin including 90 percent by mass or more of a (meth)acrylic acid-based monomer is contained as a constituent component. Furthermore, 50 percent by mass or more of the (meth)acrylic acid-based monomer is a biomass-derived (meth)acrylate having a plant-derived alcohol as an ester residue. In consideration of reduction in $CO_2$ emission and $CO_2$ circulation, as the biomass degree is increased higher, the environmental load can be more effectively reduced, and a content of the biomass-derived (meth)acrylate is preferably 80 percent by mass or more. In addition, within the range described above, an arbitrary (meth)acrylate having a petroleum-derived alcohol as an ester residue may also be contained as a constituent component.

Furthermore, it is characterized in that among the biomass-derived (meth)acrylates, at least one selected from the group consisting of ethyl (meth)acrylate, tetrahydrofurfuryl (meth)acrylate, and isobornyl (meth)acrylate is included as the constituent component. The ethyl (meth)acrylate includes ethanol as an ester residue, and the ethanol is a plant-derived alcohol which is a biomass obtained by decomposition of starches or saccharides or by fermentation. The tetrahydrofurfuryl (meth)acrylate includes tetrahydrofurfuryl alcohol as an ester residue, and the tetrahydrofurfuryl alcohol is a plant-derived alcohol which is a biomass obtained by denaturing a furan derivative obtained from corns or the like. The isobornyl (meth)acrylate includes isoborneol as an ester residue, and the isoborneol is a plant-derived alcohol which is a biomass obtained in a manner such that α-pinene formed from pine resins and/or pine essential oils is isomerized into camphene and is further denatured.

Since including as the constituent components, those (meth)acrylates and also other (meth)acrylates each having a biomass-derived alcohol as an ester residue, the (meth) acrylic resin obtained therefrom is characterized to have a biomass degree of 20% or more which is calculated from the biomass-derived (meth)acrylates. In consideration of the reduction in $CO_2$ emission and the $CO_2$ circulation, as the biomass degree is increased higher, the environmental load can be more effectively reduced, and the biomass degree is preferably 50% or more.

The structure of the (meth)acrylic resin is a diblock polymer formed from polymer blocks including a polymer block A and a polymer block B. The polymer block A is a substantially water-insoluble polymer block and is characterized to have a number average molecular weight of 5,000 to 30,000, a molecular weight distribution (weight average molecular weight/number average molecular weight) of 1.0 to 1.6, and a glass transition temperature of 70° C. or more. In addition, the molecular weight is a molecular weight on the polystyrene equivalent basis by a gel permeation chromatography. When the clear ink is formed into a film, since being a substantially water-insoluble polymer block and having the molecular weight as described above, the polymer block A is a polymer block which contributes to the film characteristics, such as adhesion to a substrate, water resistance, abrasion resistance, and alcohol resistance.

The number average molecular weight of the polymer block A is 5,000 to 30,000. When the number average molecular weight thereof is less than 5,000, since the molecular weight is excessively small, the film characteristics described above may not be obtained in some cases, and when the number average molecular weight described above is more than 30,000, although the (meth)acrylic resin is dispersed or emulsified in water in the form of particles, the particle diameter thereof may be excessively increased, or the dispersion or the emulsification may be made unstable in some cases. In order to further secure the film characteristics, such as the adhesion, and the stability of the dispersion/ emulsification, the number average molecular weight described above is preferably 6,000 to 20,000.

Since having a molecular weight distribution of 1.0 to 1.6, the polymer block A is characterized to have a uniform molecular weight. Since the molecular weight distribution thereof is in the range described above, a polymer chain having a small molecular weight and a polymer chain having a large molecular weight out of the molecular weight range described above are not included, and hence, the film characteristics can be maintained and improved.

The polymer block A has a glass transition temperature of 70° C. or more. When the glass transition temperature thereof is increased, the film is made hard, and the abrasion resistance of the film characteristics can be improved. The glass transition temperature described above is more preferably 80° C. or more.

The polymer block B includes as a constituent component, (meth)acrylic acid and is a polymer block having a number average molecular weight of 1,000 to 10,000 and an acid value derived from the (meth)acrylic acid of 50 to 330 mgKOH/g. Since having a carboxy group derived from the (meth)acrylic acid, when this carboxy group is neutralized with an alkali, this polymer block B is turned into a water-soluble polymer block. Since substantially not dissolved in water, the polymer block A is formed into particles in water, and this neutralized polymer block B is dissolved in water, so that the (meth)acrylic resin can be significantly stably dispersed/emulsified in water in the form of particles. In addition, because of the stable dispersion/emulsification state, the ejection stability of the ink jet ink can be improved. Furthermore, since being a water-soluble polymer block, even when the polymer block B is dried, the polymer block B can be again dissolved when an alkali water or a rinsing liquid, such as an organic solvent aqueous solution, is used; hence, drying of a head can be prevented, and deinking can be performed as recycling of ink and labels. In addition, the carboxy group has a function to improve the adhesion by bonds, such as hydrogen bonds and ion bonds, to the substrate.

The polymer block B has a number average molecular weight of 1,000 to 10,000. When the number average molecular weight thereof is less than 1,000, the molecular weight is excessively small, and the stability of dispersion/emulsification of the polymer block A in water may be insufficient in some cases, and when the number average molecular weight described above is more than 10,000, since the molecular weight of the polymer block B dissolved in water is excessively increased, the viscosity of the ink is unfavorably increased, and furthermore, the ejection cannot be preferably performed in some cases. In particular, the number average molecular weight described above is preferably 2,000 to 8,000.

Since having a molecular weight distribution of 1.0 to 1.6, the polymer block B is characterized to have a uniform molecular weight. Since the molecular weight distribution thereof is in the range described above, a polymer chain having a small molecular weight and a polymer chain having a large molecular weight out of the molecular weight range described above are not included, and hence the stability of dispersion/emulsification can be improved, and the increase in viscosity can be prevented.

The polymer block B has a glass transition temperature of 70° C. or more. As is the case of the polymer block A, when the glass transition temperature of the polymer block B is increased, the film is made hard, and the abrasion resistance of the film characteristics can be improved. The glass transition temperature described above is more preferably 80° C. or more.

The (meth)acrylic resin described above is a diblock polymer including the polymer block A and the polymer block B, and the number average molecular weight of the entire (meth)acrylic resin has the ranges of the molecular weights of the respective polymer blocks described above and is 10,000 to 40,000. When the number average molecular weight described above is less than 10,000, since the molecular weight is small, the film characteristics, such as the adhesion and the abrasion resistance, may not be obtained in some cases. On the other hand, when the number average molecular weight described above is more than 40,000, since the molecular weight is large, the dispersion/emulsification may be made unstable, the particle diameter may be increased when the dispersion/emulsification is performed, and/or the viscosity may be increased in some cases. In particular, the number average molecular weight described above is preferably 12,000 to 30,000.

In addition, since the (meth)acrylic resin includes a carboxy group derived from the polymer block B, the acid value of the (meth)acrylic resin has the range of the acid value of the polymer block B described above and is 25 to 100 mgKOH/g. When the acid value described above is smaller than 25 mgKOH/g, portions to be dissolved in water are decreased, the stability of dispersion/emulsification may not be obtained, and/or the particle diameter may be increased in some cases. When the acid value described above is more than 100 mgKOH/g, many carboxy groups each having a high hydrophilic property are contained, and as a result, the water resistance and the alcohol resistance of the film may be degraded in some cases. In particular, the acid value is preferably 30 to 80 mgKOH/g.

Since a polymer to be used for the clear ink is the (meth)acrylic resin described above, when the carboxy group derived from the (meth)acrylic acid which is the constituent component thereof is neutralized with an alkali, the carboxy group is ionized, the polymer block B is dissolved in water, and the (meth)acrylic resin can be emulsified in water. The (meth)acrylic resin used for the clear ink is characterized by being emulsified in water, and the number average particle diameter of the (meth)acrylic resin thus emulsified is characterized to have 10 to 300 nm by light scattering. When the number average particle diameter described above is less than 10 nm, the (meth)acrylic resin is not formed into particles and is dissolved in water, and hence the viscosity of the ink may be increased in some cases, and when the number average particle diameter described above is more than 300 nm, an ink jet head may be clogged in some cases. In particular, the number average particle diameter described above is preferably 40 to 200 nm. The alkali to be used is not particularly limited, and for example, at least one selected from the group consisting of ammonia; organic amines, such as triethylamine and dimethylaminoethanol; and alkaline metal hydroxides, such as sodium hydroxide and potassium hydroxide, may be used.

As the (meth)acrylic acid-based monomer forming the (meth)acrylic resin described above, an acrylic acid-based monomer and a methacrylic acid-based monomer both may be used, and in particular, a methacrylic acid-based monomer is preferable in terms of adhesion or the like. That is, among the (meth)acrylates described above, a methacrylate is particularly preferable.

1.2. Resin

1.2.1. Non-Biomass Resin

The clear ink may further contain a known resin. Although the known resin is not particularly limited, for example, there may be mentioned an urethane resin, an acrylic resin, an AS resin, an ABS resin, a PET resin, a polyolefin resin, a styrene-acrylic resin, a polyester resin, a polyamide resin, a polyacetal resin, a PBT resin, a PPS resin, a PSU resin, a silicone resin, an urea resin, a melamine resin, a vinyl chloride resin, an epoxy resin, a phenol resin, a phenoxy resin, or a copolymer of at least one of those mentioned above. The resin may also be an emulsion. The resin may also be partially or entirely dissolved in water or an ink solvent. Since the resin as described above is used, the adhesion and the abrasion resistance of a coating film can be further improved.

The resin is further preferably an emulsion. Since the resin as described above is used, the viscosity of the ink is further decreased, and the intermittent ejection stability tends to be further improved.

1.2.2. Biomass Resin

The clear ink may further contain a known biomass resin. As the known biomass resin, for example, there may be mentioned pine resin, lacquer, amber, natural rubber, shellac, gelatin, tortoiseshell, or casein.

The urethane resin is not particularly limited as long as having an urethane bond in its molecule, and there may be mentioned a polyether type urethane resin having an ether bond in its main chain, a polyester type urethane resin having an ester bond in its main chain, or a polycarbonate type urethane resin having a carbonate bond in its main chain. In view of environmental compatibility, a bio-based urethane resin is preferable.

Although the acrylic resin is not particularly limited, for example, there may be mentioned an acrylic acid resin, an acrylate resin, an acrylic acid-acrylonitrile copolymer, a vinyl acetate-acrylate copolymer, an acrylic acid-acrylate copolymer, a styrene-acrylic acid copolymer, a styrene-methacrylic acid copolymer, or a styrene-methacrylic acid-acrylate copolymer. In view of the reduction in $CO_2$ emission, a bio-based acrylic resin is preferable. The acrylic resin indicates a resin including a methacrylic resin.

When the clear ink contains the resin, a content of the resin with respect to the total mass of the ink is preferably 0.1 to 5.0 percent by mass, more preferably 0.1 to 4.0 percent by mass, even more preferably 0.1 to 3.0 percent by mass, further preferably 0.1 to 2.0 percent by mass, and particularly preferably 0.1 to 1.0 percent by mass.

1.3. Wax Emulsion

Although the wax emulsion is not particularly limited, for example, a paraffin wax emulsion or a polyolefin wax emulsion may be mentioned.

As the wax, for example, a petroleum wax, an animal wax, or a plant wax may be mentioned. As the petroleum wax, for example, a polyethylene wax emulsion, a polypropylene wax, a paraffin wax, a microcrystalline wax, or a petrolatum may be mentioned.

As the animal wax, for example, a lanoline or a beeswax may be mentioned.

Among those waxes mentioned above, the plant wax is preferable, and for example, there may be mentioned an avocado oil, a linseed oil, an almond oil, a fennel oil, a perilla oil, an olive oil, an orange oil, an orange roughy oil, a cacao butter, a chamomile oil, a carrot oil, a cucumber oil, an apricot kernel oil, a kukui nut oil, a walnut oil, a wheat germ oil, a sesame oil, a rice oil, a rice-bran oil, a sasanqua oil, a safflower oil, a salada oil, a Shea butter, a soybean oil, a tea oil, an evening primrose oil, a camellia oil, a corn oil, a rapeseed oil, a persic oil, a castor oil, a sunflower oil, a grapeseed oil, a hazelnut oil, a macadamia nut oil, a cottonseed oil, a meadowfoam oil, a peanut oil, a rose hips oil, a turtle oil, a cacao butter, a palm oil, a palm kernel oil, a Japan wax, a coconut oil, or a wax formed from a hydrogen additive or a derivative of one of those oils mentioned above. In addition, a carnauba wax may also be mentioned.

Since the wax emulsion is contained, the abrasion resistance of a recorded matter tends to be further improved. In this specification, the "wax emulsion" indicates an emulsion in which solid wax particles are dispersed in water primarily using a surfactant.

The "paraffin wax" in this specification indicates a so-called petroleum-based wax which is a mixture containing a linear paraffin-based hydrocarbon (normal paraffin) having approximately 20 to 30 carbon atoms as a primary component and a hydrocarbon having a weight average molecular weight of approximately 300 to 500 which contains a small amount of isoparaffin.

In addition, although the polyolefin wax emulsion is not particularly limited, for example, a polyethylene wax emulsion or a polypropylene wax emulsion may be mentioned.

A solid content of the wax emulsion with respect to the total mass of the ink is preferably 0.1 to 5.0 percent by mass, more preferably 0.3 to 4.0 percent by mass, even more preferably 0.3 to 3.0 percent by mass, further preferably 0.5 to 2.5 percent by mass, and particularly preferably 0.6 to 1.9 percent by mass. Since the solid content of the wax emulsion is in the range described above, the abrasion resistance of a recorded matter tends to be further improved.

1.4. Silicone-Acrylic Resin

The clear ink preferably further contains a silicone-acrylic resin. Since the clear ink contains a silicone-acrylic resin, besides improvement in abrasion resistance, an anti-blocking property tends to be further improved. An acrylic resin component forming the silicone-acrylic resin indicates a component including an acrylic resin and a methacrylic resin.

As the silicone-acrylic resin, for example, there may be mentioned a (graft)copolymer between a (meth)acrylic monomer and a dialkylsiloxane monomer, an acrylic-silicone copolymer, an acrylic-modified organopolysiloxane, an acrylic acid-silicone copolymer, a silicone-modified (meth) acrylic polymer, or a polyorganosiloxane formed by graft copolymerization of (meth)acrylate.

The silicone-acrylic resin may also be in the form of an emulsion. In the case described above, an average particle diameter of the silicone-acrylic resin is preferably 50 to 600 nm, more preferably 100 to 500 nm, even more preferably 150 to 400 nm, and further preferably 200 to 400 nm. Since the average particle diameter of the silicone-acrylic resin is in the range described above, the abrasion resistance and the anti-blocking property tend to be further improved.

The silicone-acrylic resin may be anionic, cationic, or nonionic. Although being not particularly limited, the silicone-acrylic resin is preferably anionic. Accordingly, the dispersion stability tends to be further improved.

A content of the silicone-acrylic resin with respect to the total mass of the ink is preferably 0.1 to 3.0 percent by mass, more preferably 0.2 to 2.0 percent by mass, and further preferably 0.3 to 1.0 percent by mass. Since the content of the silicone-acrylic resin is in the range described above, the abrasion resistance and the anti-blocking property tend to be further improved.

1.5. Water

The clear ink of this embodiment is a water-based ink. The water-based ink is an ink containing water as a primary solvent component. A content of the water in the clear ink with respect to the total mass of the ink is preferably 50 percent by mass or more, more preferably 53 to 99 percent by mass, even more preferably 55 to 90 percent by mass, further preferably 60 to 85 percent by mass, and particularly preferably 65 to 80 percent by mass.

1.6. Water-Soluble Organic Solvent

The ink composition of this embodiment preferably contains a water-soluble organic solvent. Since the ink composition contains a water-soluble organic solvent, the intermittent ejection stability and the abrasion resistance tend to be further improved.

Although the organic solvent is not particularly limited, a water-soluble organic solvent is preferable. As the organic solvent as described above, for example, there may be mentioned ethylene glycol, propylene glycol, diethylene glycol, triethylene glycol, dipropylene glycol, pentamethylene glycol, trimethylene glycol, 2-buten-1,4-diol, 2-ethyl-1,3-hexanediol, 2-methyl-2,4-pentanediol, tripropylene glycol, a polyethylene glycol having an Mn of 2,000 or less, 1,3-propylene glycol, isopropylene glycol, isobutylene glycol, glycerin, meso-erythritol, pentaerythritol, 2-pyrrolidone, N-hydroxymethyl-2-pyrrolidone, N-hydroxyethyl-2-pyrrolidone, N-methyl-2-pyrrolidone, N-ethyl-2-pyrrolidone, glycol ether (such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, or dipropylene glycol monobutyl ether), 3-methoxy-N,N-dimethylpropaneamide, 3-butoxy-N,N-dimethylpropaneamide, 3-methoxy-3-methyl-1-butanol (Solfit) or an aliphatic diol having 4 to 8 carbon atoms (1,2-alkyldiol, such as 1,2-pentanediol or 1,2-hexanediol, a linear alcohol, such as 1,3-propanediol, 1,4-butanediol, 1,5-pentanediol, 1,6-hexanediol, 1,7-heptanediol, or 1,8-octanediol, or a branched alcohol, such as 1,3-butanediol).

At least diethylene glycol monobutyl ether (BDG) is preferably contained. Since at least one of those mentioned above is used, a clogging resistance tends to be further improved. In addition, since those water-soluble organic solvents are each able to function as a dispersing auxiliary agent to disperse a (meth)acrylic resin or the like in water, the dispersion stability of the (meth)acrylic resin in the ink can be further improved.

A total content of diethylene glycol monobutyl ether (BDG) with respect to one part by weight of the (meth) acrylic resin is preferably 0.5 to 15 parts by weight, more preferably 0.7 to 5.0 parts by weight, even more preferably 1.0 to 3.0 parts by weight, and further preferably 1.5 to 2.0 parts by weight. In addition, a total content of 1,4-butanediol (14BG) and diethylene glycol monobutyl ether (BDG) with respect to the total mass of the ink is preferably 0.3 to 20 percent by mass and more preferably 1.0 to 10 percent by mass.

In addition, a content of a polyol-based organic solvent having a standard boiling point of more than 280° C. with respect to the total mass of the ink is preferably 0.5 percent by mass or less, more preferably 0.3 percent by mass or less, and further preferably 0.1 percent by mass or less. Although the polyol-based organic solvent having a standard boiling point of more than 280° C. is not particularly limited, for example, glycerin may be mentioned.

The water-soluble organic solvent is preferably a bio-based organic solvent. Accordingly, a clear ink in consideration of the reduction in $CO_2$ emission can be prepared.

A content of the water-soluble organic solvent with respect to the total mass of the ink is preferably 5.0 to 35 percent by mass, more preferably 10 to 30 percent by mass, and further preferably 15 to 25 percent by mass. Since the content of the water-soluble organic solvent is in the range described above, the intermittent ejection stability tends to be further improved.

1.7. Surfactant

The clear ink of this embodiment may also contain a surfactant. Although the surfactant is not particularly limited, for example, an acetylene glycol-based surfactant, a fluorine-based surfactant, or a silicone-based surfactant may be mentioned. Among those mentioned above, a silicone-based surfactant is preferable. Since at least one of those mentioned above is used, pin holes are not likely to be generated, and the intermittent ejection stability tends to be further improved.

The acetylene glycol-based surfactant is not particularly limited, and for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof is preferable. In addition, the acetylene glycol-based surfactant may be used alone, or at least two types thereof may be used in combination.

The fluorine-based surfactant is not particularly limited, and for example, there may be mentioned a perfluoroalkyl sulfonate, a perfluoroalkyl carboxylate, a perfluoroalkyl phosphoric acid ester, a perfluoroalkyl ethylene oxide adduct, a perfluoroalkyl betaine, or a perfluoroalkylamine oxide compound. In addition, the fluorine-based surfactant may be used alone, or at least two types thereof may be used in combination.

As the silicone-based surfactant, for example, a polysiloxane-based compound or a polyether-modified organosiloxane may be mentioned. In addition, the silicone-based surfactant may be used alone, or at least two types thereof may be used in combination.

As the polyether modified silicone-based surfactant, a commercial product may also be used. For example, there may be mentioned BELSIL Series, such as DMC6038, OW1500, or SPG128VP (manufactured by Asahi Kasei Corporation), DOWSIL Series, such as 501WAdditive, FZ-2104Fluid, FZ-2110, FZ-2123, FZ-2164, FZ-2191, FZ-5609Fluid, L-7001, L-7002, L-7604, OFX-0309Fluid, OFX-5211Fluid, SF8410Fluid, OFX-0193Fluid, SH-3746Fluid, SH-3771Fluid, SH-8400Fluid, SH-8700Fluid, or Y-7006 (manufactured by Dow Corning Toray Co., Ltd.), Silface Series, such as SAG001, SAG002, SAG003, SAG005, SAG008, SAG009, SAG010, SAG014, SAG-503A, SJM002, or SJM003 (manufactured by Nisshin Chemical Industry Co., Ltd.), or BYK-017, BYK-018, BYK-019, BYK-021, BYK-023, BYK-024, BYK-025, BYK-028, BYK-044, BYK-093, BYK-094, BYK-1610, BYK-1615, BYK-1650, BYK-1730, BYK-1770, or BYK-1798 (manufactured by BYK Japan KK).

A content of the surfactant with respect to the total mass of the ink is preferably 0.1 to 3.0 percent by mass, more preferably 0.1 to 2.0 percent by mass, and further preferably 0.3 to 1.0 percent by mass. Since the content of the surfactant is in the range described above, pin holes are not likely to be generated, and the intermittent ejection stability tends to be further improved.

1.8. pH Adjuster

Although a pH adjuster is not particularly limited, for example, an inorganic acid (such as a sulfuric acid, a hydrochloric acid, or a nitric acid), an inorganic base (such as lithium hydroxide, sodium hydroxide, potassium hydroxide, or ammonia), an organic base (such as triethanolamine (TEA), diethanolamine, monoethanolamine, or tripropanolamine), or an organic acid (such as adipic acid, citric acid, or succinic acid). Among those mentioned above, an organic base is preferable. The pH adjuster may be used alone, or at least two types thereof may be used in combination.

A content of the pH adjuster with respect to the total mass of the ink is preferably 0.01 to 1.0 percent by mass, more preferably 0.03 to 0.5 percent by mass, and further preferably 0.05 to 0.3 percent by mass. Since the content of the pH adjuster is in the range described above, the intermittent ejection stability tends to be further improved.

1.9. Chelating Agent

The ink composition may further contain a chelating agent. Although the chelating agent is not particularly limited, for example, an ethylenediaminetetraacetate (EDTA) salt, an edentate disalt, a pyrophosphate salt, a hexametaphosphate salt, citric acid, tartaric acid, or gluconic acid may be mentioned. The chelating agent may be used alone, or at least two types thereof may be used in combination.

A content of the chelating agent with respect to the total mass of the ink is preferably 0.01 to 1.0 percent by mass, more preferably 0.03 to 0.5 percent by mass, and further preferably 0.05 to 0.3 percent by mass. Since the content of the chelating agent is in the range described above, the intermittent ejection stability tends to be further improved.

1.10. Biomass Degree

For example, Japan Organics Recycling Association has approved products having a biomass degree of 10 or more for environmental appeals.

A biomass degree of a dried solid content of the clear ink is preferably 10 percent by mass or more, more preferably 20 percent by mass or more, even more preferably 30 percent by mass or more, further preferably 40 percent by mass or more, and particularly preferably 50 percent by mass or more. In addition, although an upper limit of the biomass degree of the dried solid content of the clear ink is not particularly limited, for example, the upper limit described above is 100 percent by mass or less and may be 90 percent by mass or less. Since the biomass degree of the dried solid content of the clear ink is 10 percent by mass or more, an ink having an environmental compatibility, that is, an ink in consideration of the reduction in $CO_2$ emission, can be provided.

The biomass degree of the dried solid content of the clear ink can be measured by a biomass-degree measurement method described in Example using a dried product which is obtained after the clear ink is sufficiently dried.

1.11. Surface Tension

A surface tension of the clear ink at 25° C. is preferably 35 mN/m or less, more preferably 30 mN/m or less, and further preferably 28 mN/m or less. In addition, a lower limit of the surface tension of the clear ink at 25° C. is preferably 20 mN/m or more. Since the surface tension described above is in the range described above, pin holes are not likely to be generated, and the intermittent ejection stability tends to be further improved.

In addition, in this embodiment, the surface tension can be measure at a liquid temperature of 25° C. by Wilhelmy method using a surface tensiometer (such as surface tensiometer CBVP-Z, manufactured by Kyowa Interface Science Co., Ltd.).

2. Ink Set

An ink set of this embodiment includes a clear ink and a color ink, and the clear ink is the ink jet ink composition described above. The ink set is a set including at least two types of inks to be used for recording.

2.1. Color Ink

The color ink is an ink to be used to color a recording medium. As the color ink, besides a colorant, components similar to the components of the clear ink described above may be contained, and the contents thereof may also be set to the same ranges as those of the clear ink described above.

In particular, the color ink may contain a colorant, a resin, a wax emulsion, a surfactant, a pH adjuster, a chelating agent, and/or the like. In addition, the resin of the color ink may be either a biomass resin or a non-biomass resin and may not contain the (meth)acrylic resin described above.

As the colorant contained in the color ink, a pigment and/or a dye may be mentioned. Although the color ink is not particularly limited, for example, at least one of a cyan ink, a magenta ink, a yellow ink, and a black ink may be mentioned. In the ink set, at least two color inks may be included.

Although the pigment is not particularly limited, for example, there may be mentioned an azo pigment (such as an azo lake, an insoluble azo pigment, a condensed azo pigment, or a chelating azo pigment; a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment); an organic pigment, such as a nitro pigment, a nitroso pigment, or an aniline black; a carbon black (such as a furnace black, a thermal lamp black, an acetylene black, or a channel black); an inorganic pigment, such as a metal oxide, a metal sulfide, or a metal chloride; or an extender pigment, such as calcium carbonate or a talk. The pigment may be used alone, or at least two types thereof may be used in combination.

Although the dye is not particularly limited, for example, an acidic dye, a basic dye, a direct dye, a reactive dye, or a disperse dye may be mentioned.

A content of the colorant with respect to the total mass of the ink is preferably 0.5 to 10 percent by mass, more preferably 1.0 to 8.0 percent by mass, even more preferably 1.5 to 6.0 percent by mass, and further preferably 2.0 to 5.0 percent by mass.

3. Recording Method

A recording method of this embodiment includes an ejection step of ejecting the clear ink described above to a recording medium by an ink jet method. In addition, the recording method of this embodiment may further include an ejection step of ejecting a color ink to the recording medium by an ink jet method. In the ejection step, after the color ink is adhered to the recording medium, the clear ink may be adhered thereto, after the clear ink is adhered to the recording medium, the color ink may be adhered thereto, or the clear ink and the color ink may be simultaneously adhered to the recording medium. Among those mentioned above, the clear ink and the color ink are preferably adhered to the recording medium so as to be overlapped with each other.

The recording method of this embodiment may be either a multi-pass type recording method or a one-pass type recording method.

In the one-pass type recording method, for example, a line printer may be used. The line printer has an ink jet head (hereinafter, also referred to as "line head" in some cases) which includes a nozzle line having a length equivalent to or larger than a width of a recording medium. In addition, while the positions of the line head and the recording medium are relatively transferred in a scanning direction intersecting a width direction, the ink is ejected from the line head to the recording medium. In the line printer, the line head is fixed and is not transferred, and the recording medium may be transported so as to pass under the line head. Accordingly, by the relative scanning of the one-pass ink jet head and the recording medium, the recoding can be performed.

In the multi-pass type recording method, for example, a serial printer may be used. The serial printer has an ink jet head (hereinafter, also referred to as "serial head" in some cases) which ejects the ink while reciprocally moving (shuttle movement) in a direction orthogonal to the transport direction of a recording medium. While reciprocally moving (shuttle movement) in a direction orthogonal to the transport direction of the recording medium, the serial head performs recording, in general, by at least two passes (multi-pass).

In the recording method of this embodiment, the recording may be performed using a long recording medium by a roll-to-roll method. In particular, after one end of a roll-shaped recording medium on which no recording is performed is drawn out, the recording is performed thereon by the line head, and the recording medium on which the recording is performed is then wound into a roll shape, so that the recording by a roll-to-roll method can be realized. In the roll-to-roll method as described above, the line printer described above is preferably used. In the recording medium which is wound into a roll shape after the recording, a surface to which the ink is adhered and a surface to which no ink is adhered are to be brought into contact with each other in the roll, and hence, the blocking is liable to occur.

As the recording medium, an absorbing recording medium, a low-absorbing recording medium, or a non-absorbing recording medium may be used. Among those mentioned above, a low-absorbing recording medium or a non-absorbing recording medium is preferable.

In addition, the "low-absorbing recording medium" indicates a recording medium having a water absorption amount of 5 to 10 mL/m$^2$ for 30 milliseconds from a contact start measured by Bristow method, and the "non-absorbing recording medium" indicates a recording medium having a water absorption amount of less than 5 mL/m$^2$.

This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000.

The absorbing recording medium is not particularly limited, and for example, there may be mentioned regular paper, such as electrophotographic paper, having a high ink permeability of an ink composition or ink jet paper (ink jet exclusive paper having an ink absorbing layer formed from silica particles or alumina particles or an ink absorbing layer formed from a hydrophilic polymer, such as a polyvinyl alcohol (PVA) or a polyvinyl pyrrolidone (PVP)).

Although the low-absorbing recording medium is not particularly limited, for example, a coating paper in which a coating layer to receive an oil ink is provided on a substrate surface may be mentioned. Although the coating paper is not particularly limited, for example, printing paper, such as art paper, coated paper, or mat paper, may be mentioned.

Although the non-absorbing recording medium is not particularly limited, for example, there may be mentioned a film or a plate formed from a plastic, such as a poly(vinyl chloride), a polyethylene, a polypropylene, a poly(ethylene terephthalate) (PET), a polycarbonate, a polystyrene, or a polyurethane; a plate formed from a metal, such as iron, silver, copper, or aluminum; a metal plate or a plastic-made film manufactured by deposition of at least one of the various metals mentioned above; a plate formed from an alloy, such as stainless steel or brass; or a recording medium in which a film of a plastic, such as a poly(vinyl chloride), a polyethylene, a polypropylene, a poly(ethylene terephthalate) (PET), a polycarbonate, a polystyrene, or a polyurethane, is adhered (coated) to a paper-made substrate.

Furthermore, besides the recording media described above, an ink non-absorbing or an ink low-absorbing recording medium, such as a plate formed from a metal including one of iron, silver, copper, and aluminum, or a glass, may also be used.

4. Recording Apparatus

A recording apparatus of this embodiment includes an ink jet head to eject the clear ink described above to a recording medium, and, if needed, may also include an ink jet head to eject a color ink.

As one example of an ink jet recording apparatus, FIGURE shows a perspective view of a serial printer. As shown in FIGURE, a serial printer 20 includes a transport portion 220 and a recording portion 230. The transport portion 220 transports a recording medium F supplied to the serial printer to the recording portion 230 and discharges the recording medium on which recording is performed from the serial printer. In particular, the transport portion 220 has feed rollers to transport the recording medium F thus supplied in a sub-scanning direction T1.

In addition, the recording portion 230 includes a carriage 234 mounting an ink jet head 231 having a nozzle to eject an ink composition to the recording medium F transported from the transport portion 220 and a carriage transfer mechanism 235 to transfer the carriage 234 in main scanning directions S1 and S2.

In the case of the serial printer, as the ink jet head 231, a head having a length smaller than the width of the recording medium is provided, and since the head is transferred, the recording is performed by multi-pass operation. In addition, in the serial printer, since the head 231 is mounted on the carriage 234 to be transferred in a predetermined direction and is transferred when the carriage is transferred, the ink composition is ejected on the recording medium F. Accordingly, the recording is performed by at least two passes (multi-pass operation). In addition, the pass is also called a main scanning. Between the passes, a sub-scanning to transport the recording medium is performed. That is, the main scanning and the sub-scanning are alternately performed.

In addition, the ink jet recording apparatus of this embodiment is not limited to the serial type printer described above, and the line type printer described above may also be used. The line type printer is a printer which performs recording on the recording medium by one scanning using a line head which is an ink jet head having a length equivalent to or larger than the width of the recording medium.

EXAMPLES

Hereinafter, the present disclosure will be described in more detail with reference to Examples and Comparative Examples. The present disclosure is not at all limited to the following Examples.

1. Synthesis Of (Meth)Acrylic Resin

1.1. Synthetic Example 1 (Manufacturing Of (Meth)Acrylic Resin (Polymer Emulsion) E-1)

In a reaction chamber equipped with a stirring device, a thermometer, a reflux condenser, and a nitrogen inlet tube, 236.3 parts by weight of diethylene glycol monobutyl ether (BDG) as a solvent, 2.3 parts by weight of 2-iodo-2-cyanopropane (CPI), 3.7 parts by weight of 2,2-azobis(4-methoxy-2,4-dimethylvaleronitrile (trade name "V-70", manufactured by FUJIFILM Wako Pure Chemical Corporation), 0.1 parts by weight of N-iodosuccinimide (NIS), 68.7 parts by weight of tetrahydrofurfuryl methacrylate (THFMA), and 68.7 parts by weight of isobornyl methacrylate (IBXMA) were charged.

Incidentally, tetrahydrofurfuryl methacrylate (THFMA) was a methacrylate of a biological material-derived alcohol and had a biomass degree of 55.5%, and the methacrylate described above was obtained by a reaction between methacrylic acid and tetrahydrofurfuryl alcohol formed by hydrogenation of furfural obtained from cores of corns.

In addition, isobornyl methacrylate (IBXMA) was a methacrylate of a biological material-derived alcohol and had a biomass degree of 71.4%, and the methacrylate described above was obtained by a reaction between a methacrylic acid and camphene formed by isomerization of α-pinene obtained from pine resins or pine essential oils.

While nitrogen was bubbled to the raw materials in the reaction chamber, a polymer (polymer block A) was synthesized by polymerization at 45° C. for 4 hours. The reaction solution was partially sampled and measured, and it was found that a solid content thereof was 37.4%, and a polymerization conversion rate calculated from the solid content was approximately 100%. A number average molecular weight (Mn) of the polymer block A on the polystyrene equivalent basis measured by a GPC using tetrahydrofuran (THF) as a developing solvent was 10,000, and the polydispersity index (PDI=weight average molecular weight (Mw)/number average molecular weight (Mn)) was 1.2. Hereinafter, the molecular weight was measured by the method described above. A glass transition temperature (Tg) of this polymer block A was 101.5° C. which was obtained by calculation using Tg's of the homopolymers described above and composition mixing ratios thereof. The calculation was performed such that a Tg of a THFMA homopolymer and that of an IBXMA homopolymer were assumed to be 60° C. and 155° C., respectively. Hereinafter, Tg was obtained by the calculation described above.

After the solution of the polymer block A thus obtained was cooled to a temperature of 40° C., 2.7 parts by weight of V-70, 18.0 parts by weight of THFMA, 54.1 parts by weight of IBXMA, and 18.0 parts by weight of methacrylic acid (MAA) were added in the reaction chamber. The polymer block B was formed by polymerization at 40° C. for 4 hours, so that an A-B diblock copolymer was obtained. By a residual monomer amount measured by solid content measurement and gas chromatography, the polymerization was confirmed to be almost completed. After the reaction solution was partially sampled and then measured, it was found that a solid content thereof was approximately 50%, and the polymerization conversion rate was approximately 100%. The A-B diblock copolymer thus obtained had a number average molecular weight (Mn) of 17,000 and a PDI of 1.3, and a GPC peak of the polymer block A was shifted to a high molecular weight side, so that the A-B diblock copolymer was confirmed. That is, the number average molecular weight (Mn) of the polymer block B was 7,000. In addition, the acid value of the polymer block B calculated from the content of MAA thus blended was 130.3 mgKOH/g. In addition, Tg of the polymer block B obtained from the mixing ratio thereof was 143.3° C. The calculation was performed such that Tg of an MAA homopolymer was assumed to be 228° C. After a part of the polymer solution was sequentially treated so as to be precipitated in methanol, filtrated, sufficiently washed with methanol, and then dried, a resin solid thus obtained was titrated with a 0.1-N ethanolic potassium hydroxide solution, and it was found that the acid value thereof was 51.5 mgKOH/g.

Subsequently, a mixture solution containing 14.0 parts by weight of 28%-ammonia water and 458.6 parts by weight of ion exchange water was added in a room temperature environment for neutralization and emulsification, so that a polymer emulsion E-1 was obtained. In addition, next, the amount of water was adjusted and added to obtain a polymer content of 25%. A solid content of the polymer emulsion E-1 was 25.1%. In addition, after being sufficiently diluted with water, E-1 was measured using a dynamic light scattering type particle diameter distribution measurement apparatus (particle size measurement apparatus, trade name "nanoSAQRA", manufactured by Otsuka Electronics Co., Ltd.), and it was found that the number average particle diameter of emulsion particles was 75 nm. In addition, when the pH was measured, it was 8.9. Furthermore, when the viscosity was measured using an E type viscometer, it was 3.6 Pa·s at 25° C.

In addition, the biomass degree was 60.9. This biomass degree was a biomass degree obtained by the following calculation method.

Polymer biomass degree=Σ(number of moles×number of carbon atoms×biomass degree of monomer i)/100 parts by weight of polymer/Σ(number of moles×nuumber of carbon atoms of monomer i)/100 parts by weight of polymer (monomer i indicates an $i^{th}$ monomer, and i indicates an integer of from 1 to n (last number)).

In this polymer, the biomass degree was calculated as shown below. Hereinafter, the biomass degree was calculated in a manner similar to that described above.

(0.243×14×71.4% (IBXMA)+0.224×9×55.5% (THFMA)+0.092×4×0(methacrylic acid)/(0.243×14 (IBXMA)+0.224×9 (THFMA)+0.092×4 (methacrylic acid)=3.55/5.83=60.9%

1.2. Synthetic Examples 2 to 6 and Comparative Synthetic Examples 1 to 3

Except for that the compositions shown in Table 1 were used, polymer emulsions E-2 to E-6, H-1 to H-3 were obtained in a manner similar to that in Synthetic Example 1. The physical properties of the polymers and emulsions thus obtained are collectively shown in Table 1 together with those of Synthetic Example 1.

TABLE 1

| | | SYNTHETIC EXAMPLE | | | | | | COMPARATIVE SYNTHETIC EXAMPLE | | |
|---|---|---|---|---|---|---|---|---|---|---|
| | | 1 | 2 | 3 | 4 | 5 | 6 | 1 | 2 | 3 |
| SAMPLE NAME | | E-1 | E-2 | E-3 | E-4 | E-5 | E-6 | H-1 | H-2 | H-3 |
| POLYMER BLOCK A | THFMA | 68.7 | 48.1 | 103 | | | 55 | 34.3 | 150.3 | |
| | IBXMA | 68.7 | 48.1 | 103 | 68.7 | 34.3 | 82.4 | 34.3 | 150.3 | 68.7 |
| | EMA | | | | 68.7 | 68.7 | | | | |
| | BzMA | | | | | 34.3 | | | | |
| | LMA | | | | | | | | | 68.7 |
| | Mn | 10000 | 7100 | 16300 | 8600 | 9600 | 6900 | 4200 | 31000 | 11200 |
| | PDI | 1.2 | 1.15 | 1.33 | 1.19 | 1.22 | 1.14 | 1.11 | 1.61 | 1.14 |
| | Tg | 101.5 | 101.5 | 101.5 | 104.7 | 80.6 | 113.7 | 104.7 | 104.7 | 6.9 |
| POLYMER BLOCK B | V70 | 2.7 | 3.6 | 2.7 | 2.7 | 2.7 | | 2.7 | 5.4 | 2.7 |
| | THFMA | 18 | 26.2 | 12 | | | 12 | 12 | 36 | |
| | IBXMA | 54.1 | 70.5 | 36.1 | 54.1 | 30.1 | 24.1 | 36.1 | 108.4 | 54.1 |
| | EMA | | | | 18 | 24 | 12 | | | |
| | BzMA | | | | | 24 | | | | |
| | LMA | | | | | | | | | 18 |
| | MAA | 18 | 26.2 | 12 | 18 | 12 | 12 | 12 | 36 | 18 |
| | Mn | 7.000 | 9800 | 5000 | 6200 | 8000 | 4900 | 4900 | 15000 | 8400 |
| | ACID VALUE mgKOH/g | 130.3 | 139 | 130.2 | 130.1 | 86.9 | 130.5 | 130.1 | 130.1 | 130.1 |
| | Tg | 143.3 | 142.6 | 143.3 | 144.9 | 104.6 | 122.7 | 144.9 | 144.9 | 88.9 |
| A-B DIBLOCK COPOLYMER | Mn | 17000 | 16900 | 21300 | 14800 | 17600 | 11800 | 9100 | 46000 | 19600 |
| | PDI | 1.3 | 1.28 | 1.52 | 1.26 | 1.45 | 1.29 | 1.18 | 1.89 | 1.2 |
| | ACID VALUE mgKOH/g | 51.5 | 78 | 29.4 | 51.4 | 34.4 | 39.5 | 51.4 | 51.5 | 51.5 |
| 28%-AMMONIA WATER | | 14 | 16.5 | 9.3 | 14 | 9.3 | 9.3 | 14 | 28 | 9.3 |
| SOLID CONTENT (%) | | 25.1 | 25.3 | 25 | 24.7 | 25.1 | 25 | 25.1 | 25.4 | 25.3 |
| AVERAGE PARTICLE DIAMETER (nm) | | 75 | 56 | 134 | 78 | 101 | 88 | 50 | 298 | 68 |
| pH | | 8.9 | 9.1 | 8.6 | 8.9 | 8.9 | 9.2 | 8.9 | 8.9 | 8.9 |
| VISCOSITY (PA·s) | | 3.6 | 9.1 | 1.6 | 2.9 | 3.5 | 2.3 | 1.9 | 24.3 | 3.9 |
| BIOMASS DEGREE | | 60.9 | 59.6 | 62.5 | 53.7 | 34.4 | 60.9 | 60.7 | 61.5 | 68.5 |

Monomer

THFMA: tetrahydrofurfuryl methacrylate, methacrylate of a biological material-derived alcohol obtained by a reaction between methacrylic acid and tetrahydrofurfuryl alcohol formed by hydrogenation of furfural obtained from cores of cones, biomass degree: 55.5%.

IBXMA: isobornyl methacrylate, methacrylate of a biological material-derived alcohol obtained by a reaction between methacrylic acid and camphene formed by isomerization of α-pinene obtained from pine resins or pine essential oils, biomass degree: 71.4%.

EMA: ethyl methacrylate, methacrylate of a biological material-derived alcohol, an esterified compound between methacrylate and ethanol obtained by decomposition of starches and saccharides, biomass degree: 33.3%.

BzMA: benzyl methacrylate, methacrylate of a petroleum-derived alcohol, biomass degree: 0%.

LMA: lauryl methacrylate, methacrylate of a biological material-derived alcohol, an esterified compound between methacrylic acid and lauryl alcohol which is formed such that lauric acid is obtained by distillation of aliphatic acids formed by hydrolysis of fats and oils, such as palm kernel oil and coconut oil, and is then processed by hydrogen reduction, biomass degree: 75.0%.

2. Preparation of Clear Ink

Components were mixed together to form the compositions shown in the following Tables 2 to 3, so that clear inks were obtained. In addition, in Table 1, the composition is represented by percent by mass.

2.1. Measurement Method of Surface Tension

In Examples, the surface tension was measured at a liquid temperature of 25° C. by Wilhelmy method using a surface tensiometer (such as surface tensiometer CBVP-Z, manufactured by Kyowa Interface Science Co., Ltd.).

2.2. Measurement Method of Biomass Degree

In Examples, the biomass degree was measured in accordance with ASTM D6866 by the AMS method and then calculated by the following equation.

Biomass degree (%)=(C14 weight of material/total carbon weight of material)×100

TABLE 2

COMPARATIVE REFERENCE

| | | BIOMASS DEGREE | COMPARATIVE EXAMPLE 1 A-23 | REFERENCE EXAMPLE 1 A-24 | EXAMPLE 1 A-1 | EXAMPLE 2 A-2 | EXAMPLE 3 A-3 | EXAMPLE 4 A-4 | EXAMPLE 5 A-5 | EXAMPLE 6 A-6 | COMPARATIVE EXAMPLE 2 A-25 | COMPARATIVE EXAMPLE 3 A-26 | COMPARATIVE EXAMPLE 4 A-27 | EXAMPLE 7 A-7 | EXAMPLE 8 A-8 | EXAMPLE 9 A-9 |
|---|---|---|---|---|---|---|---|---|---|---|---|---|---|---|---|---|
| BIOMASS RESIN | SYNTHETIC EXAMPLE 1 | 60.9 | 4.0 | | 4.0 | | | | | | | | | 3.0 | 2.0 | 1.0 |
| | SYNTHETIC EXAMPLE 1 (REDUCTION OF BDG) | 60.9 | | | | | | | | | | | | | | |
| | SYNTHETIC EXAMPLE 2 | 59.6 | | | | 4.0 | | | | | | | | | | |
| | SYNTHETIC EXAMPLE 3 | 62.5 | | | | | 4.0 | | | | | | | | | |
| | SYNTHETIC EXAMPLE 4 | 53.7 | | | | | | 4.0 | | | | | | | | |
| | SYNTHETIC EXAMPLE 5 | 34.4 | | | | | | | 4.0 | | | | | | | |
| | SYNTHETIC EXAMPLE 6 | 60.9 | | | | | | | | 4.0 | | | | | | |
| | COMPARATIVE SYNTHETIC EXAMPLE 1 | 60.7 | | | | | | | | | 4.0 | | | | | |
| | COMPARATIVE SYNTHETIC EXAMPLE 2 | 61.5 | | | | | | | | | | 4.0 | | | | |
| | COMPARATIVE SYNTHETIC EXAMPLE 3 | 68.5 | | | | | | | | | | | 4.0 | | | |
| NON-BIOMASS RESIN | BONRON S-434 | 0.0 | | 4.0 | | | | | | | | | | 1.0 | 2.0 | 3.0 |
| | HYDRAN AP201 | 0.0 | | | | | | | | | | | | | | |
| WAX EMULSION | AQUACER513 | 0.0 | | 1.0 | 1.0 | 1.0 | 1.0 | 1.0 | 1.0 | 1.0 | 1.0 | 1.0 | 1.0 | 1.0 | 1.0 | 1.0 |
| | CELLOSOLE-314 | 70.0 | | | | | | | | | | | | | | |
| SILICONE-ACRYLIC RESIN | CHALINE LC 190 | 0.0 | | | | | | | | | | | | | | |

TABLE 2-continued

| | | BIOMASS DEGREE | COMPARATIVE EXAMPLE 1 A-23 | REFERENCE EXAMPLE 1 A-24 | EXAMPLE 1 A-1 | EXAMPLE 2 A-2 | EXAMPLE 3 A-3 | EXAMPLE 4 A-4 | EXAMPLE 5 A-5 | EXAMPLE 6 A-6 | COMPARATIVE EXAMPLE 2 A-25 | COMPARATIVE EXAMPLE 3 A-26 | COMPARATIVE EXAMPLE 4 A-27 | EXAMPLE 7 A-7 | EXAMPLE 8 A-8 | EXAMPLE 9 A-9 |
|---|---|---|---|---|---|---|---|---|---|---|---|---|---|---|---|---|
| WATER-SOLUBLE ORGANIC SOLVENT | 12HD | | 5.0 | 5.0 | 5.0 | 5.0 | 5.0 | 5.0 | 5.0 | 5.0 | 5.0 | 5.0 | 5.0 | 5.0 | 5.0 | 5.0 |
| | PG | | 10.0 | 10.0 | 10.0 | 10.0 | 10.0 | 10.0 | 10.0 | 10.0 | 10.0 | 10.0 | 10.0 | 10.0 | 10.0 | 10.0 |
| | 14BG | | 1.0 | 1.0 | 1.0 | 1.0 | 1.0 | 1.0 | 1.0 | 1.0 | 1.0 | 1.0 | 1.0 | 1.0 | 1.0 | 1.0 |
| | BDG | | 5.0 | 5.0 | 5.0 | 5.0 | 5.0 | 5.0 | 5.0 | 5.0 | 5.0 | 5.0 | 5.0 | 5.0 | 5.0 | 5.0 |
| SURFACTANT | BYK349 | | 0.5 | 0.5 | 0.5 | 0.5 | 0.5 | 0.5 | 0.5 | 0.5 | 0.5 | 0.5 | 0.5 | 0.5 | 0.5 | 0.5 |
| | E1010 | | | | | | | | | | | | | | | |
| PH-ADJUSTER | TEA | | 0.1 | 0.1 | 0.1 | 0.1 | 0.1 | 0.1 | 0.1 | 0.1 | 0.1 | 0.1 | 0.1 | 0.1 | 0.1 | 0.1 |
| CHELATING AGENT | EDTA2Na | | 0.2 | 0.2 | 0.2 | 0.2 | 0.2 | 0.2 | 0.2 | 0.2 | 0.2 | 0.2 | 0.2 | 0.2 | 0.2 | 0.2 |
| TOTAL | | | 100 | 100 | 100 | 100 | 100 | 100 | 100 | 100 | 100 | 100 | 100 | 100 | 100 | 100 |
| SOLID CONTENT BIOMASS | | | 2.4 | 0.0 | 2.4 | 2.4 | 2.5 | 2.1 | 1.4 | 2.4 | 2.4 | 2.5 | 2.7 | 1.8 | 1.2 | 0.6 |
| TOTAL SOLID CONTENT | | | 4.0 | 5.0 | 5.0 | 5.0 | 5.0 | 5.0 | 5.0 | 5.0 | 5.0 | 5.0 | 5.0 | 5.0 | 5.0 | 5.0 |
| INK SURFACE TENSION | | | 27.0 | 27.0 | 27.0 | 27.0 | 27.0 | 27.0 | 27.0 | 27.0 | 27.0 | 27.0 | 27.0 | 27.0 | 27.0 | 27.0 |
| INK BIOMASS DEGREE | | | | 0.0 | 49.0 | 48.0 | 50.0 | 43.0 | 28.0 | 49.00 | 49.0 | 49.0 | 55.0 | 37.0 | 24.0 | 12.0 |

TABLE 3

| | | BIOMASS DEGREE | EXAMPLE 10 A-10 | 11 A-11 | 12 A-12 | 13 A-13 | 14 A-14 | 15 A-15 | 16 A-16 | 17 A-17 | 18 A-18 | 19 A-19 | 20 A-20 | 21 A-21 | 22 A-22 |
|---|---|---|---|---|---|---|---|---|---|---|---|---|---|---|---|
| BIOMASS RESIN | SYNTHETIC EXAMPLE 1 | 60.9 | 1.0 | 1.0 | 1.0 | 4.0 | 4.0 | 4.0 | 0.5 | 4.0 | 2.0 | 1.0 | 4.0 | | |
| | SYNTHETIC EXAMPLE 1 (REDUCTION OF BDG) | 60.9 | | | | | | | | | | | | 4.0 | 4.0 |
| | SYNTHETIC EXAMPLE 2 | 59.6 | | | | | | | | | | | | | |
| | SYNTHETIC EXAMPLE 3 | 62.5 | | | | | | | | | | | | | |
| | SYNTHETIC EXAMPLE 4 | 53.7 | | | | | | | | | | | | | |
| | SYNTHETIC EXAMPLE 5 | 34.4 | | | | | | | | | | | | | |
| | SYNTHETIC EXAMPLE 6 | 60.9 | | | | | | | | | | | | | |
| | COMPARATIVE SYNTHETIC EXAMPLE 1 | 60.7 | | | | | | | | | | | | | |
| | COMPARATIVE SYNTHETIC EXAMPLE 2 | 61.5 | | | | | | | | | | | | | |
| | COMPARATIVE SYNTHETIC EXAMPLE 3 | 68.5 | | | | | | | | | | | | | |
| NON-BIOMASS RESIN | BONRON S-434 | 0.0 | 3.0 | 3.0 | | | | | 35 | | 2.0 | 3.0 | | | |
| | HYDRAN AP201 | 0.0 | | | 3.0 | | | | | | | | | | |
| WAX EMULSION | AQUACER513 | 0.0 | 2.0 | 1.0 | 1.0 | 0.5 | 2.0 | | 1.0 | 1.0 | 1.0 | 1.0 | 1.0 | 1.0 | 10 |
| | CELLOSOLE-314 | 70.0 | | 1.0 | | | | 2.0 | 1.0 | | | | | | |
| SILICONE-ACRYLIC RESIN | CHALINE LC190 | 0.0 | | | | | | | | 0.5 | 0.5 | 0.5 | | | |
| WATER-SOLUBLE ORGANIC | 12HD | | 5.0 | 5.0 | 5.0 | 5.0 | 5.0 | 5.0 | 5.0 | 5.0 | 5.0 | 5.0 | 5.0 | 5.0 | 5.0 |
| | PG | | 10.0 | 10.0 | 10.0 | 10.0 | 10.0 | 10.0 | 10.0 | 10.0 | 10.0 | 10.0 | 10.0 | 10.0 | 10.0 |
| | 14BG | | 1.0 | 1.0 | 1.0 | 10 | 1.0 | 1.0 | 1.0 | 1.0 | 1.0 | 1.0 | 1.0 | 10 | 5.0 |

TABLE 3-continued

| | | BIOMASS DEGREE | EXAMPLE | | | | | | | | | | | | |
|---|---|---|---|---|---|---|---|---|---|---|---|---|---|---|---|
| | | | 10 A-10 | 11 A-11 | 12 A-12 | 13 A-13 | 14 A-14 | 15 A-15 | 16 A-16 | 17 A-17 | 18 A-18 | 19 A-19 | 20 A-20 | 21 A-21 | 22 A-22 |
| SOLVENT | BDG | | 5.0 | 5.0 | 5.0 | 5.0 | 5.0 | 5.0 | 5.0 | 5.0 | 5.0 | 5.0 | 5.0 | 1.0 | 1.0 |
| SURFACTANT | BYK349 | | 0.5 | 0.5 | 0.5 | 0.5 | 0.5 | 0.5 | 0.5 | 0.5 | 0.5 | 0.5 | | 0.5 | 0.5 |
| | E1010 | | | | | | | | | | | | 0.5 | | |
| pH ADJUSTER | TEA | | 0.1 | 0.1 | 0.1 | 0.1 | 0.1 | 0.1 | 0.1 | 0.1 | 0.1 | 0.1 | 0.1 | 0.1 | 0.1 |
| CHELATING AGENT | EDTA2Na | | 0.2 | 0.2 | 0.2 | 02 | 0.2 | 0.2 | 0.2 | 0.2 | 0.2 | 0.2 | 0.2 | 0.2 | 0.2 |
| TOTAL | | | 100 | 100 | 100 | 100 | 100 | 100 | 100 | 100 | 100 | 100 | 100 | 100 | 100 |
| SOLID CONTENT BIOMASS | | | 0.6 | 1.3 | 0.6 | 2.4 | 2.4 | 3.8 | 1.0 | 2.4 | 1.2 | 0.6 | 2.4 | 2.4 | 2.4 |
| TOTAL SOLID CONTENT | | | 6.0 | 6.0 | 5.0 | 4.5 | 6.0 | 6.0 | 6.0 | 5.5 | 5.5 | 5.5 | 5.0 | 5.0 | 5.0 |
| INK SURFACE TENSION | | | 27.0 | 27.0 | 27.0 | 27.0 | 27.0 | 27.0 | 27.0 | 27.0 | 27.0 | 27.0 | 31.0 | 27.0 | 27.0 |
| INK BIOMASS DEGREE | | | 10.0 | 22.0 | 12.0 | 54.0 | 41.0 | 64.0 | 17.0 | 44.0 | 22.0 | 11.0 | 49.0 | 49.0 | 49.0 |

The raw materials shown in the above Tables 2 to 3 are as described below.

Non-Biomass Resin
  Bonron S-434, styrene-acrylic-based resin emulsion, manufactured by Mitsui Chemicals, Inc.
  Hydran AP201, aqueous urethane resin, manufactured by DIC Corporation Wax Emulsion
  AQUACER 513 (non-biomass): water-based HDPE ultra-fine particle wax emulsion, manufactured by BYK
  Cellosole Y-314 (biomass): carnauba wax emulsion, silicone-acrylic resin, manufactured by Chukyo Yushi Co., Ltd.
  Chaline LC190: silicone-acrylic resin, manufactured by Nisshin Chemical Industry Co., Ltd.

Water-Soluble Organic Solvent
  12HD: 1,2-hexanediol
  PG (biobase): polyethylene glycol, Radianol 4710, manufactured by Oleon
  14BG (biobase): 1,4-butanediol, manufactured by Genomatica
  BDG: diethylene glycol monobutyl ether Surfactant
  BYK349: silicone-based surfactant, manufactured by BYK Japan KK
  E1010: acetylene glycol-based surfactant, manufactured by Nisshin Chemical Industry Co., Ltd.

pH Adjuster
  TEA: triethanolamine

Chelating Agent
  EDTA2Na: disodium ethylenediaminetetraacetate

3. Evaluation Method 3.1. Test of Abrasion Resistance

By using a PX-G930 (including a modified platen heater), on a 100%-solid pattern printed by a genuine cyan ink for use with Surepress L-4533A, the clear inks shown in Tables 2 to 3 were each printed at a duty of 20%, so that a recorded matter was obtained. In addition, the dot weight of the clear ink was set to 13 ng, the recording resolution was set to 720×720 dpi, the platen temperature was set to 55° C., and drying after printing was performed at 70° C. for one minute.

The abrasion resistance test was performed based on JIS L0849 2013 using a Gakushin type rubbing tester AB-301. The abrasion resistance test includes a dry rubbing test using a dry cotton cloth and a wet rubbing test using a wet cotton cloth, and the two types of tests described above were performed. The dry rubbing test was performed such that the cotton cloth was reciprocally moved 100 times with a load of 200 g, and the wet rubbing test was performed such that the cotton cloth was reciprocally moved 10 times with a load of 200 g. By the ink jet recording apparatus described above, a recorded matter having a size of 1.0 inches by 0.5 inches was obtained on each recording medium. One day after the recording, the cotton cloth was pressed on a solid image of the recorded matter for evaluation. Subsequently, the stain on the cotton cloth, the stain on a non-recorded portion, and the peeling degree of a printed portion were confirmed by visual inspection, and the evaluation of the abrasion resistance was performed in accordance with the following evaluation criteria.

Evaluation Criteria

A: No stain on cotton cloth and no stain on non-recorded portion are observed, and no peeling of printed portion is observed.

B: Stain on cotton cloth and stain on non-recorded portion are not almost observed, and peeling of printed portion is almost not observed.

C: Although being observed, stain on cotton cloth and stain on non-recorded portion are slight, and peeling of printed portion is almost not observed.

D: Stain on cotton cloth and stain on non-recorded portion are observed, and peeling of printed portion is also observed.

3.2. Test of Intermittent Ejection Stability

By the use of a printer px-g930 (manufactured by Seiko Epson Corporation), in an environment at a temperature of 40° C. and a relative humidity of 20%, ejection stability in intermittent printing was evaluated. First, it was confirmed that the ink jet ink composition was normally ejected from all the nozzles. In addition, after the ink jet ink composition was ejected on an A4 size OHP film, 2-minute downtime was taken in an environment at a temperature of 40° C. and a relative humidity of 20%, and the ink jet ink composition was then again ejected on A4 size photo paper. In the second ejection, a positional shift between a dot position of a first droplet adhered to the A4 size photo paper and a targeted dot position was measured by an optical microscope. Based on the positional shift between the dots thus obtained, the intermittent performance was evaluated in accordance with the following evaluation criteria.

Evaluation Criteria

AA: Positional shift between dots is 5 µm or less. A: Positional shift between dots is more than 5 to 10 µm.

B: Positional shift between dots is more than 10 to 20 µm.

C: Positional shift between dots is more than 20 to 30 µm.

D: Positional shift between dots is more than 30 µm.

3.3. Test of Clogging Recovery Property

By the use of a printer PX-G930 (manufactured by Seiko PMC Corporation), the clogging recovery property was evaluated in an environment at a temperature of 40° C. and a relative humidity of 20%. First, it was confirmed that the ink jet ink composition was normally ejected from all the nozzles. Subsequently, the printer was left for one month in an environment at a temperature of 40° C. and a relative humidity of 20%. After the printer was left as described above, until the ink jet ink composition was normally ejected from all the nozzles, cleaning was repeatedly performed. In addition, the number of cleanings thus performed was measured, and the clogging recovery property was evaluated in accordance with the following evaluation criteria.

Evaluation Criteria

A: number of cleanings is 3 times or less. B: number of cleanings is 4 to 6 times. C: number of cleanings is 7 to 9 times. D: although number of cleanings is 10 times or more, nozzles are not all recovered.

3.4. Evaluation of Image Quality

By the use of a PX-G930 which was modified to have a heating platen, the clear ink composition was printed at a duty of 100% on a corona-treated OPP film (FOS-AQ*60, manufactured by Futamura Chemical Co., Ltd.) at a dot weight of 13 ng, a recording resolution of 720×720 dpi, and a platen temperature of 55° C. After drying was performed at 90° C. for one minute, the presence or not of pin holes (repelling marks) having a diameter of 1 mm or more was observed in a clear ink printed region, and the image quality was evaluated in accordance with the following evaluation criteria.

Evaluation Criteria

A: No pin holes are observed.

B: Pin holes are observed.

TABLE 4

| | | | COMPARATIVE EXAMPLE 1 A-23 | REFERENCE EXAMPLE 1 A-24 | EXAMPLE 1 A-1 | EXAMPLE 2 A-2 | EXAMPLE 3 A-3 | EXAMPLE 4 A-4 | EXAMPLE 5 A-5 | EXAMPLE 6 A-6 | COMPARATIVE EXAMPLE 2 A-25 | COMPARATIVE EXAMPLE 3 A-26 | COMPARATIVE EXAMPLE 4 A-27 | EXAMPLE 7 A-7 | EXAMPLE 8 A-8 | EXAMPLE 9 A-9 |
|---|---|---|---|---|---|---|---|---|---|---|---|---|---|---|---|---|
| ABRASION RESISTANCE | 55PW8R | DRY RUBBING | B | A | A | A | A | A | A | A | B | A | B | A | A | A |
| | NP COAT | DRY RUBBING | D | B | A | A | A | A | B | A | B | A | B | A | A | A |
| | CAST 73 | DRY RUBBING | D | B | A | A | A | A | B | A | B | A | B | A | A | A |
| | GLOSS PW | DRY RUBBING | D | B | B | B | B | B | B | B | C | B | C | B | B | B |
| | PET50A | DRY RUBBING | A | A | A | A | A | A | B | A | B | A | B | A | A | A |
| | | WET RUBBING | A | A | A | A | A | A | B | A | B | A | B | A | A | A |
| | YUPO 80 | DRY RUBBING | D | B | B | B | B | B | B | B | C | B | C | B | B | B |
| | | WET RUBBING | D | C | C | C | C | C | C | C | D | C | D | C | C | C |
| INTERMITTENT PERFORMANCE | NON-CIRCULATION HEAD | | B | A | B | B | B | B | B | B | B | D | B | A | A | A |
| CLOGGING | 40° C. FOR 1 MONTH | | A | A | A | A | A | A | A | A | A | A | A | A | A | A |
| IMAGE QUALITY | PIN HOLES | | A | A | A | A | A | A | A | A | A | A | A | A | A | A |

| | | | EXAMPLE 10 A-10 | EXAMPLE 11 A-11 | EXAMPLE 12 A-12 | EXAMPLE 13 A-13 | EXAMPLE 14 A-14 | EXAMPLE 15 A-15 | EXAMPLE 16 A-16 | EXAMPLE 17 A-17 | EXAMPLE 18 A-18 | EXAMPLE 19 A-19 | EXAMPLE 20 A-20 | EXAMPLE 21 A-21 | EXAMPLE 22 A-22 |
|---|---|---|---|---|---|---|---|---|---|---|---|---|---|---|---|
| ABRASION RESISTANCE | 55PW8R | DRY RUBBING | A | A | A | A | A | A | A | A | A | A | A | A | A |
| | NP COAT | DRY RUBBING | A | A | A | B | A | A | A | A | A | A | A | A | A |
| | CAST 73 | DRY RUBBING | A | A | A | A | B | A | B | A | A | A | A | A | A |
| | GLOSS PW | DRY RUBBING | A | A | B | B | A | B | A | A | A | A | B | B | B |
| | PET50A | DRY RUBBING | A | A | A | A | A | A | A | A | A | A | A | A | A |
| | | WET RUBBING | A | A | A | A | A | A | A | A | A | A | A | A | A |

TABLE 4-continued

| | | | | | | | | | | | | | | |
|---|---|---|---|---|---|---|---|---|---|---|---|---|---|---|
| | YUPO 80 | DRY RUBBING | A | B | B | C | A | C | B | A | A | A | B | B | B |
| | | WET RUBBING | C | C | C | C | C | C | C | B | B | B | C | C | C |
| INTERMITTENT PERFORMANCE | NON-CIRCULATION HEAD | | A | A | A | B | B | B | A | C | B | B | B | A | A |
| CLOGGING | 40° C. FOR 1 MONTH | | A | A | A | A | A | A | A | A | A | A | A | C | A |
| IMAGE QUALITY | PIN HOLES | | A | A | A | A | A | A | A | A | A | A | B | A | A |

4. Preparation of Ink Set

By the use of a pigment dispersion liquid formed in the following pigment dispersion-liquid preparation example, components were mixed together so as to obtain the compositions shown in the following Table 5, so that color inks were obtained. In Table 5, the composition was represented by percent by mass. In addition, by the combination shown in Table 6, ink sets were prepared.

4.1. Pigment Dispersion-Liquid Preparation Example 1 (Manufacturing of Pigment Dispersion Liquid P-1)

First, after 500 g of ion exchange water and 150 g of a carbon black were mixed together, this mixture was stirred for 30 minutes by a rocking mill using zirconia beads having a diameter of 1 mm, so that the pigment was pre-wetted. Next, 4,485 g of ion exchange water was added to the pigment thus treated and then dispersed using a high-pressure homogenizer. In this case, the pigment had an average particle diameter of 110 nm. After the pigment thus treated was transferred to a high-pressure container and then pressurized at a pressure of 3 MPa, ozone water at an ozone concentration of 100 ppm was introduced, so that an ozone oxidation treatment was performed on the surface of the pigment. Subsequently, after this dispersion liquid was processed to have a pH of 9.0 using an aqueous sodium hydroxide solution at a concentration of 0.1 mol/L, the concentration of a pigment solid content was adjusted, so that a pigment dispersion liquid P-1 was obtained. In the pigment dispersion liquid P-1, a self-dispersible pigment having a -COONa group bonded to the particle surface was contained, and a content of the pigment was 15 percent by mass.

4.2. Pigment Dispersion-Liquid Preparation Example 2 (Manufacturing of Pigment Dispersion Liquid P-2)

First, 500 g of a carbon black, 1,000 g of a water-soluble resin, and 14,000 g of water were mixed together to form a mixture. As the water-soluble resin, a resin was used which was obtained in a manner such that a styrene-acrylic acid copolymer having an acid value of 100 mgKOH/g and a weight average molecular weight of 10,000 was neutralized with an aqueous sodium hydroxide solution at a concentration of 0.1 mol/L. After this mixture was dispersed for one hour by a rocking mill using zirconia beads having a diameter of 1 mm, impurities were removed by centrifugal separation, and reduced pressure filtration was further performed using a microfilter (manufactured by Millipore) having a pore size of 5.0 μm. Next, the concentration of the pigment solid content was adjusted, so that a pigment dispersion liquid P-2 having a pH of 9.0 was obtained. In the pigment dispersion liquid P-2, a pigment dispersed by the water-soluble resin (resin dispersant) was contained, and the content of the pigment and that of the resin were 15.0 percent by mass and 7.5 percent by mass, respectively.

4.3. Pigment Dispersion-Liquid Preparation ExamplE 3 (Manufacturing of Pigment Dispersion Liquid P-3)

After a reaction chamber equipped with a stirring device, a thermometer, a reflux condenser, and a dipping funnel was purged with nitrogen, and 300 parts by weight of methyl ethyl ketone was then charged, 40 parts by weight of styrene, 40 parts by weight of ethyl methacrylate, 5 parts by weight of lauryl acrylate, 5 parts by weight of lauryl methacrylate, 5 parts by weight of methoxypolyethylene glycol 400 acrylate AM-90G (manufactured by Shin-Nakamura Chemical Co., Ltd.), 5 parts by weight of acrylic acid, 0.2 parts by weight of ammonium persulfate, and 0.3 parts by weight of t-dodecyl mercaptan were received in the dripping funnel and then dripped in the reaction chamber over 4 hours, so that a polymerization reaction was performed to form a polymer dispersant. Subsequently, methyl ethyl ketone was added to the reaction chamber, and a solution of the polymer dispersant at a concentration of 40 percent by weight was prepared.

When the polymer dispersant solution was measured by a gel permeation chromatography (GPC) apparatus named L7100 system (manufactured by Hitachi, Ltd.) using THF as a developing solvent, the weight average molecular weight on the polystyrene equivalent basis was 58,000. In addition, the polydispersity index (Mw/Mn) was 3.1.

In addition, 40 parts by weight of the polymer dispersant solution described above, 30 parts by weight of chromofine-blue C.I. Pigment Blue 15:3 (trade name, hereinafter, also referred to as "PB 15:3" in some cases, manufactured by Dainichiseika Color & Chemicals Mfg. Co., Ltd.) as a cyan pigment, 100 parts by weight of an aqueous sodium hydroxide solution at a concentration of 0.1 mol/L, and 30 parts by weight of methyl ethyl ketone were mixed together and then processed by an 8-pass dispersion treatment using an ultimizer 25005 (trade name, manufactured by Sugino Machine Co., Ltd.). Subsequently, after 300 parts by weight of ion exchange water was added, the total methyl ethyl ketone and part of water were distilled off using a rotary evaporator, and neutralization was then performed using a sodium hydroxide solution at a concentration of 0.1 mol/L, so that the pH was adjusted to be 9. Next, while the volume average particle diameter of the cyan pigment was measured using a particle size distribution meter, the pigment was further dispersed until the volume average particle diameter thereof reached 100 nm and was then filtrated using a membrane filter having a pore size of 3 μm, so that a pigment dispersion liquid P-3 having a solid content (polymer dispersant and pigment) of 15 percent by weight was obtained.

4.4. Pigment Dispersion-Liquid Preparation Example 4 (Manufacturing of Pigment Dispersion Liquid P-4)

Except for that C.I. Pigment Red 202 was used instead of using C.I. Pigment Blue 15:3, a pigment dispersion liquid P-4 was obtained in a manner similar to that in Synthetic Example 9.

4.5. Pigment Dispersion-Liquid Preparation Example 5 (Manufacturing of Pigment Dispersion Liquid P-5)

Except for that C.I. Pigment Yellow 180 was used instead of using C.I. Pigment Blue 15:3, a pigment dispersion liquid P-5 was obtained in a manner similar to that in Synthetic Example 9.

4.6. Pigment Dispersion-Liquid Preparation Example 6 (Manufacturing of Pigment Dispersion Liquid P-6)

Except for that C.I. Pigment White 6 was used instead of using C.I. Pigment Blue 15:3, a pigment dispersion liquid P-6 was obtained in a manner similar to that in Synthetic Example 9.

TABLE 5

|  |  |  | BIOMASS DEGREE | COLOR INK | | | | | | | |
|---|---|---|---|---|---|---|---|---|---|---|---|
|  |  |  |  | B-1 | B-2 | B-3 | B-4 | B-5 | B-6 | B-7 | B-8 |
| PIGMENT | P-3 | Cy | 0 | 4.0 |  |  |  |  |  | 4.0 | 4.0 |
|  | P-4 | Mg | 0 |  | 4.0 |  |  |  |  |  |  |
|  | P-5 | Ye | 0 |  |  | 4.0 |  |  |  |  |  |
|  | P-2 | Bk | 0 |  |  |  | 4.0 |  |  |  |  |
|  | P-1 | Bk | 0 |  |  |  |  | 4.0 |  |  |  |
|  | P-6 | Wh | 0 |  |  |  |  |  | 4.0 |  |  |
| RESIN | SYNTHETIC EXAMPLE 1 | | 60.9 | 4.0 | 4.0 | 4.0 | 4.0 | 4.0 | 4.0 |  |  |
|  | SYNTHETIC EXAMPLE 2 | | 59.6 |  |  |  |  |  |  | 4.0 |  |
|  | BONRON D-434 | | 0 |  |  |  |  |  |  |  | 4.0 |
| WAX EMULSION | AQUACER513 | | 0 | 1.0 | 1.0 | 1.0 | 1.0 | 1.0 | 1.0 | 1.0 | 1.0 |
| WATER-SOLUBLE ORGANIC SOLVENT | 12HD | | | 5.0 | 5.0 | 5.0 | 5.0 | 5.0 | 5.0 | 5.0 | 5.0 |
|  | PG | | | 10.0 | 10.0 | 10.0 | 10.0 | 10.0 | 10.0 | 10.0 | 10.0 |
|  | 14BG | | | 1.0 | 1.0 | 1.0 | 1.0 | 1.0 | 1.0 | 1.0 | 1.0 |
|  | BDG | | | 5.0 | 5.0 | 5.0 | 5.0 | 5.0 | 5.0 | 5.0 | 5.0 |
| SURFACTANT | BYK349 | | | 0.5 | 0.5 | 0.5 | 0.5 | 0.5 | 0.5 | 0.5 | 0.5 |
| pH ADJUSTER | TEA | | | 0.1 | 0.1 | 0.1 | 0.1 | 0.1 | 0.1 | 0.1 | 0.1 |
| CHELATING AGENT | EDTA2Na | | | 0.2 | 0.2 | 0.2 | 0.2 | 0.2 | 0.2 | 0.2 | 0.2 |
|  | TOTAL | | | 100 | 100 | 100 | 100 | 100 | 100 | 100 | 100 |
|  | SOLID CONTENT BIOMASS | | | 2.4 | 2.4 | 2.4 | 2.4 | 2.4 | 2.4 | 2.4 | 0.0 |
|  | TOTAL SOLID CONTENT | | | 9.0 | 9.0 | 9.0 | 9.0 | 9.0 | 9.0 | 9.0 | 9.0 |
|  | INK SURFACE TENSION | | | 27.0 | 27.0 | 27.0 | 27.0 | 27.0 | 27.0 | 27.0 | 27.0 |
|  | INK BIOMASS DEGREE | | | 27.0 | 27.0 | 27.0 | 27.0 | 27.0 | 27.0 | 26.0 | 0.0 |

The raw materials shown in the above Table 5 are as described below.

Resin
  Bonron S-434: styrene-acrylic-based resin emulsion, manufactured by Mitsui Chemicals, Inc.
Wax Emulsion
  AQUACER 513 (non-biomass): water-based HDPE ultra-fine wax emulsion, manufactured by BYK.
Water-Soluble Organic Solvent
  12HD: 1,2-hexanediol
  PG (bio-based): polyethylene glycol, Radianol 4710, manufactured by Oleon.
  14BG: (bio-based): 1,4-butanedol, manufactured by Genomatica.
  BDG: diethylene glycol monobutyl ether
Surfactant
  BYK349: silicone-based surfactant, manufactured by BYK Japan KK
pH Adjuster
  TEA: triethanolamine
Chelating Agent
  EDTA2Na: disodium ethylenediaminetetraacetate 5. Evaluation Method 5.1. Adhesion Evaluation By the use of a PX-G930 modified to have a heating platen, after the color ink composition was printed at a duty of 100% on a corona-treated OPP film (FOS-AQ*60, manufactured by Futamura Chemical Co., Ltd.) at a dot weight of 13 ng, a recording resolution of 720×720 dpi, and a platen temperature of 55° C., the clear ink composition was printed thereon at a duty of 100% and then dried at 90° C. for 10 minutes, so that a printed matter was formed.

Subsequently, after a cross-cut test in accordance with JIS-K5600 was performed, a remaining state of the ink on a film recording portion and a state of the ink transferred to a tape were observed, and the adhesion was evaluated in accordance with the following evaluation criteria.

Evaluation Criteria
  A: No peeling of film recording portion and no transfer to tape are observed.
  B: peeling of film recording portion is 5% or less.
  C: peeling of film recording portion is more than 5%, and peeling portion thereof is generated between substrate and color ink (no peeling between clear ink and color ink is observed).
  D: peeling of film recording portion is more than 5%, peeling portions thereof are generated between clear ink and color ink and between substrate and color ink.

TABLE 6

| | EXAMPLE | | | | | | | COMPARATIVE EXAMPLE | REFERENCE EXAMPLE | EXAMPLE | | | | | |
|---|---|---|---|---|---|---|---|---|---|---|---|---|---|---|---|
| | 23 | 24 | 25 | 26 | 27 | 28 | 29 | 5 | 2 | 30 | 31 | 32 | 33 | 34 | 35 |
| INK SET | S-1 | S-2 | S-3 | S-4 | S-5 | S-6 | S-7 | S-8 | S-9 | S-10 | S-11 | S-12 | S-13 | S-14 | S-15 |
| COLOR INK | B-1 | B-2 | B-3 | B-4 | B-5 | B-6 | B-7 | B-8 | B-8 | B-1 | B-1 | B-1 | B-1 | B-1 | B-1 |
| CLEAR INK | A-1 | A-1 | A-1 | A-1 | A-1 | A-1 | A-1 | A-1 | A-24 | A-2 | A-3 | A-4 | A-5 | A-6 | A-7 |
| ADHESION | A | A | A | A | A | A | A | C | D | A | A | A | A | A | A |

| | EXAMPLE | | | | | | | | | | | | | | |
|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 |
| INK SET | S-16 | S-17 | S-18 | S-19 | S-20 | S-21 | S-22 | S-23 | S-24 | S-25 | S-26 | S-27 | S-28 | S-29 | S-29 |
| COLOR INK | B-1 | B-1 | B-1 | B-1 | B-1 | B-1 | B-1 | B-1 | B-1 | B-1 | B-1 | B-1 | B-1 | B-1 | B-1 |
| CLEAR INK | A-8 | A-9 | A-10 | A-11 | A-12 | A-13 | A-14 | A-15 | A-16 | A-17 | A-18 | A-19 | A-20 | A-21 | A-22 |
| ADHESION | A | A | A | A | A | A | A | A | A | A | A | A | A | A | A |

What is claimed is:

1. An ink jet ink composition which contains water, a (meth)acrylic resin, and a wax emulsion and which is a water-based clear ink, the (meth)acrylic resin satisfying the following requirements 1 to 6,
wherein in the requirement 1, the (meth)acrylic resin includes 90 percent by mass or more of a (meth)acrylic acid-based monomer as a constituent component,
the (meth)acrylic resin is a diblock copolymer including a polymer block A and a polymer block B, 50 percent by mass or more of a monomer forming the (meth)acrylic resin is a (meth)acrylate having a plant material-derived alcohol as an ester residue,
the (meth)acrylate includes at least one selected from the group consisting of ethyl (meth)acrylate, tetrahydrofurfuryl (meth)acrylate, and isobornyl (meth)acrylate, and
the (meth)acrylic resin has a biomass degree of 20% or more,
in the requirement 2, the polymer block A of the (meth)acrylic resin is a substantially water-insoluble polymer block,
the polymer block A has a number average molecular weight of 5,000 to 30,000, and
the polymer block A has a molecular weight distribution of 1.0 to 1.6,
in the requirement 3, the polymer block B of the (meth)acrylic resin includes (meth)acrylic acid as a constituent component,
the polymer block B has a number average molecular weight of 1,000 to 10,000, and
the polymer block B has an acid value of 50 to 330 mgKOH/g,
in the requirement 4, the polymer block A and the polymer block B both have a glass transition temperature of 70° C. or more, in the requirement 5, the (meth)acrylic resin has a
number average molecular weight of 10,000 to 40,000, and the (meth)acrylic resin has an acid value of 25 to 100 mgKOH/g, and
in the requirement 6, the (meth)acrylic resin has a carboxy group neutralized with an alkali and is emulsified in water, and
the (meth)acrylic resin has a number average particle diameter of 10 to 300 nm measured by light scattering.

2. The ink jet ink composition according to claim 1, wherein the polymer block A and the polymer block B both include isobornyl (meth)acrylate as a constituent component.

3. The ink jet ink composition according to claim 1, wherein 80 percent by mass or more of the monomer forming the (meth)acrylic resin includes as a constituent component, at least one selected from the group consisting of ethyl (meth)acrylate, tetrahydrofurfuryl (meth)acrylate, and isobornyl (meth)acrylate.

4. The ink jet ink composition according to claim 1, wherein the ink jet ink composition includes a dry solid content having a biomass degree of 10 percent by mass or more.

5. The ink jet ink composition according to claim 1, wherein the ink jet ink composition has a surface tension of less than 30 mN/m at 25° C.

6. The ink jet ink composition according to claim 1, further containing a silicone-acrylic resin.

7. The ink jet ink composition according to claim 1, wherein a content of the (meth)acrylic resin with respect to a total mass of the ink jet ink composition is 0.5 to 15 percent by mass.

8. The ink jet ink composition according to claim 1, wherein a content of the wax emulsion with respect to a total mass of the ink jet ink composition is 0.3 to 3.0 percent by mass.

9. An ink set comprising:
a clear ink; and
a color ink,
wherein the clear ink is the ink jet ink composition according to claim 1.

10. A recording method comprising:
an ejection step of ejecting the ink jet ink composition according to claim 1 to a recording medium by an ink jet method.

11. The recording method according to claim 10, further comprising:
an ejection step of ejecting a color ink to the recording medium by an ink jet method,
wherein the ink jet ink composition and the color ink are adhered to the recording medium so as to be overlapped with each other.

12. The recording method according to claim 10, wherein the recording method is a multi-pass type recording method or a one-pass type recording method.

13. The recording method according to claim 10, wherein the recording is performed using a long recording medium by a roll-to-roll method.

14. The recording method according to claim 10, wherein the recording medium is a low-absorbing recording medium or a non-absorbing recording medium.

15. A recording apparatus comprising:
an ink jet head to eject the ink jet ink composition according to claim 1 to a recording medium.

* * * * *